June 22, 1948. E. F. VACIN 2,443,877
APPARATUS FOR MANUFACTURING FOOTWEAR UTILIZING
SUB-ASSEMBLIES AND APPLYING THE SAME
DIRECTLY TO THE LASTS
Filed Sept. 23, 1946 6 Sheets-Sheet 1

INVENTOR.
EMIL F. VACIN.
BY
ATTORNEYS.

June 22, 1948.   E. F. VACIN   2,443,877
APPARATUS FOR MANUFACTURING FOOTWEAR UTILIZING
SUB-ASSEMBLIES AND APPLYING THE SAME
DIRECTLY TO THE LASTS
Filed Sept. 23, 1946   6 Sheets-Sheet 2

INVENTOR.
EMIL F. VACIN.
BY
ATTORNEYS.

June 22, 1948.  E. F. VACIN  2,443,877
APPARATUS FOR MANUFACTURING FOOTWEAR UTILIZING
SUB-ASSEMBLIES AND APPLYING THE SAME
DIRECTLY TO THE LASTS
Filed Sept. 23, 1946  6 Sheets-Sheet 4

INVENTOR.
EMIL F. VACIN.
BY
ATTORNEYS.

Fig. 15

June 22, 1948. E. F. VACIN 2,443,877
APPARATUS FOR MANUFACTURING FOOTWEAR UTILIZING
SUB-ASSEMBLIES AND APPLYING THE SAME
DIRECTLY TO THE LASTS
Filed Sept. 23, 1946 6 Sheets-Sheet 6

INVENTOR.
EMIL F. VACIN.
BY
ATTORNEYS.

Patented June 22, 1948

2,443,877

UNITED STATES PATENT OFFICE 2,443,877

APPARATUS FOR MANUFACTURING FOOT-
WEAR UTILIZING SUB-ASSEMBLIES AND
APPLYING THE SAME DIRECTLY TO THE
LASTS

Emil F. Vacin, San Marino, Calif., assignor to
Joyce, Inc., Pasadena, Calif., a corporation of
California Application September 23, 1946, Serial No. 698,659

17 Claims. (Cl. 12—1)

1

The present invention relates to the manufacture of footwear, and more particularly to an improved apparatus and method for the manufacture of footwear which utilize subassemblies preliminarily produced as separate units, said parts of said units first being secured together and then to the remaining components of the completed footwear by adhesives, stitching, or other conventional means.

It is desirable that footwear be maintained in spotlessly clean condition throughout the course of its manufacture. Even a slight spot or blemish on the shoes when completed means at least the expense of an additional cleaning operation. Moreover, in order to meet the demands of the present-day shoe market, it is essential that a shoe manufacturer be able to supply shoes promptly in a large variety of patterns and colors, such as is produced only slowly and with difficulty by older methods of manufacture, wherein shoes are handled in batches on manually propelled racks which are moved from one operational area to another as each manufacturing operation is completed. Clearly, therefore, greater mechanization is indicated.

Improvement already has been made in some respects from the older methods of manufacture. Such improvement is evidenced, for example, by the so-called California process of construction and by Patents, No. 2,367,218 and No. 2,377,631, to William H. Joyce, Jr., and others. While recognizing the advantages of the stated patents for keeping the component parts in convenient juxtaposition during manufacture, the present invention is designed to facilitate and improve the production of all types of footwear, whether of slippers or shoes, for either dress or casual wear, and whether embodying arched, wedged, or other forms of midsole and outsole constructions.

In the manufacture of footwear as herein contemplated, all assembly operations will be maintained simultaneously with the final assembly operations while the footwear is traveling throughout the complete course of manufacture, thereby eliminating the need for baskets, racks, or other means of conveyance to and from various assembly machines. The invention may be readily adapted by those skilled in the art to the manufacture, for example, of footwear which is slip lasted. Thus in the California process, which obviously is adaptable for use by the means herein provided, the upper, insole and midsole or platform cover may be preliminarily stitched or otherwise secured together and the various other parts may later be assembled thereto.

2

It is therefore an object of my invention to provide a new and improved footwear manufacturing apparatus.

Another object is to provide a new and improved last conveying mechanism with automatic processing equipment associated therewith.

Another object is to provide a new and improved footwear and parts conveying apparatus.

Another object is to provide a new and improved mechanism to facilitate the manufacturing operations associated with assembling shoe elements by means of a moving conveyor.

Another object is to provide a new and improved automatic means to press the sole elements of a shoe together while the shoe is mounted on a traveling last.

A further object is to devise a new and improved manufacturing method for assembling pre-fabricated parts of shoes.

A still further object is to provide an improved method for assembling shoe sole elements on a lasted or pre-formed upper during a conveying movement of the assembled parts.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 15 is a side elevational view, parts being in section of another form of press mechanism.

It will be understood that this invention is adaptable for footwear manufacturing generally and that the type of footwear construction herein selected is by way of illustration only and not by way of limitation. Thus, as is well known to those skilled in the art of shoe manufacturing, a shoe may, but need not be preformed on the last, a midsole is sometimes employed and sometimes omitted, and the midsole cover may be preliminarily stitched to the upper and insole or applied to the midsole when the latter comprises a separate sub-assembly unit.

Figures 2, 5:
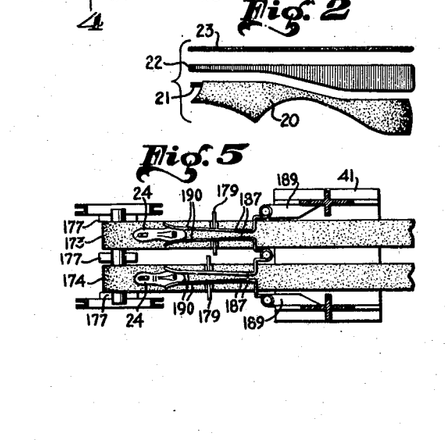
Figure 2 is a view in side elevation of the principal composite parts or sub-assemblies of one selected type of shoe disclosed and claimed in Joyce Patent No. 2,067,963, here chosen merely to illustrate the use of the invention.
Figure 5 is a sectional view taken on the line 5—5 of Figure 1, and shows a last stripper and take-off belt in plan view.

The type of shoe, however, which is herein shown to illustrate a typical manufacturing process as taught by this invention comprises four principal portions, as shown in Figure 2. Such portions are an upper 20, an insole 21, a midsole 22, and an outsole 23.

First reference in this description will be had to the form of the apparatus illustrated in Figures 1 through 14. Said figures show a conveyor 25 comprising a pair of conveyor chains 27 and 28 mounted to slide in channel track members 29 and 30. The tracks 29 and 30 are supported on horizontal frame members 31 which are spaced apart along the length of the conveyor as required, and serve also to support other apparatus to be described in detail later herein.

The two conveyor chains are mounted side by side, and are spaced apart so that each pair of lasts can be mounted laterally opposite each other with one mounted on each of the conveyor chains. Each of the conveyor chains 27 and 28 passes around a head sprocket 34 and a tail sprocket 35. The sprockets are secured to a head sprocket shaft 37 and a tail sprocket shaft 38, respectively, which are journalled in bearings 39 mounted on bearing support standards 40 and 41.

Figure 3:
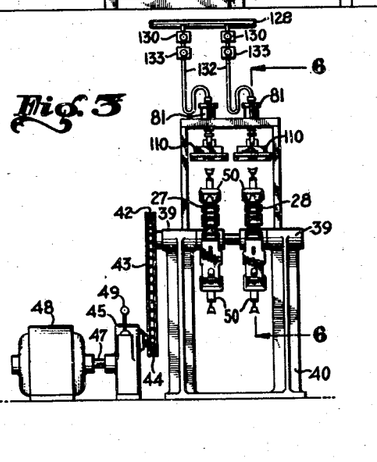
Figure 3 is a view in end elevation of the mechanism shown in Figure 1, a last take-off belt being omitted and a driving mechanism and speed control device being added to the showing of Figure 1.

A conveyor drive mechanism is illustrated in Figure 3. The head sprocket shaft 37 projects outwardly beyond its bearing 39 and has a driven sprocket 42 secured thereto. A drive chain 43 passes around the driven sprocket 42 and also around a sprocket 44 secured to the take-off shaft of a controllable speed-reducer 45. The speed reducer has direct driven connection, through its driven shaft 47 with an electric drive motor 48. A speed control lever 49 permits regulation of the speed of the take-off sprocket 44 of the speed reducer and thereby provides control of the speed of travel of the conveyor chains 27 and 28.

A plurality of pairs of last supports 50 are mounted on each of the conveyor chains at regular and equal intervals for both chains. Since the lasts and last supports are inverted during approximately half of their travel, such terms as "up" and "down" and the like, as used for these members, will refer to their positions on the upper run of the conveyor.

Figure 6:
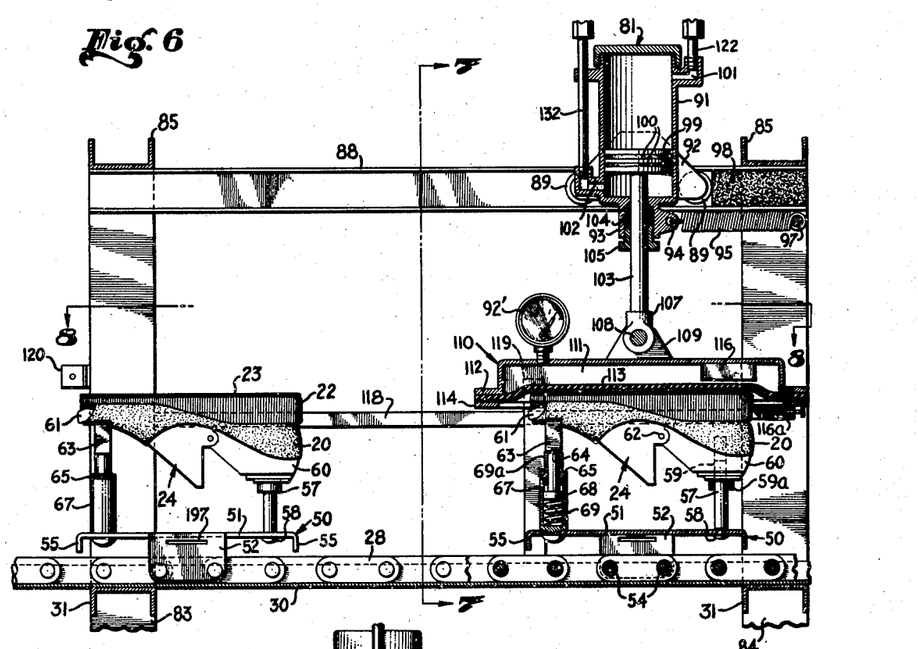
Figure 6 is an enlarged fragmentary sectional view taken on the line 6—6 of Figure 3, with the parts in the relative position which they occupy at the beginning of a sole pressing operation.
Figures 7, 7A:
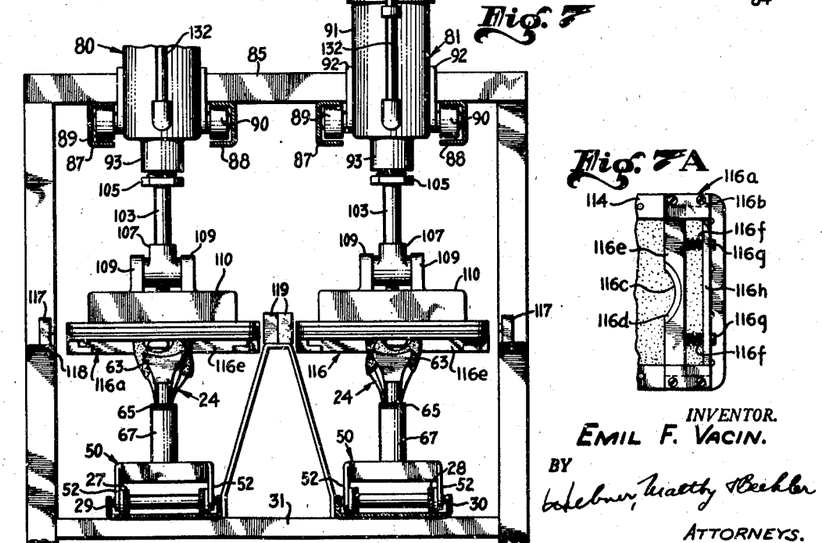
Figure 7 is a similarly enlarged fragmentary sectional view taken on the line 7—7 of Figure 6.
Figure 7A is a detailed bottom view of a heel-positioning device.
Figure 8:
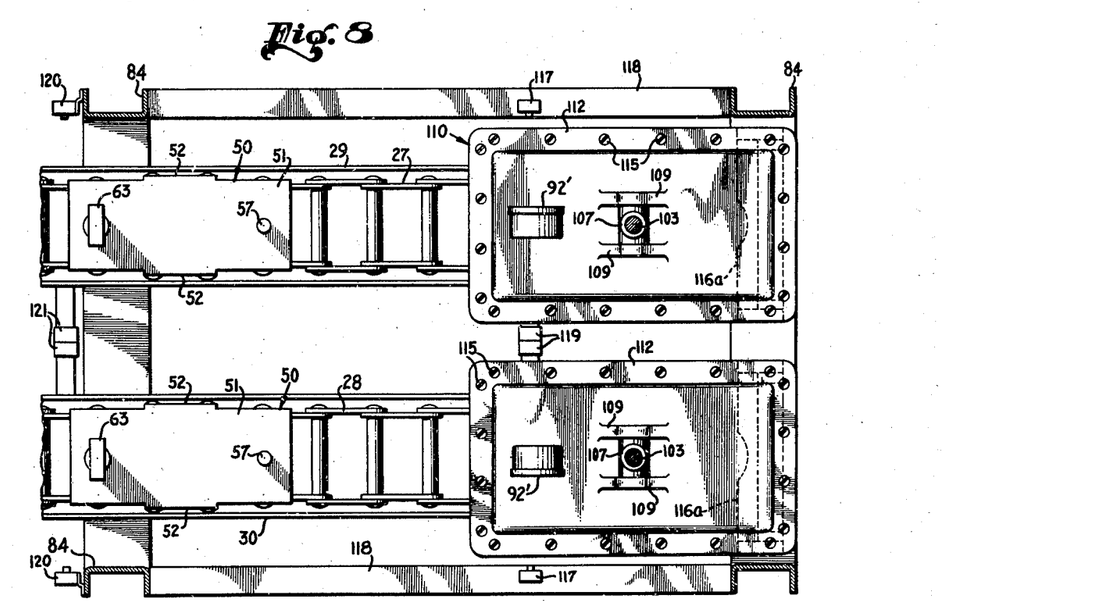
Figure 8 is a similarly enlarged fragmentary sectional view taken on the line 8—8 of Figure 6, with the lasts removed at the left hand side.
Figure 9:
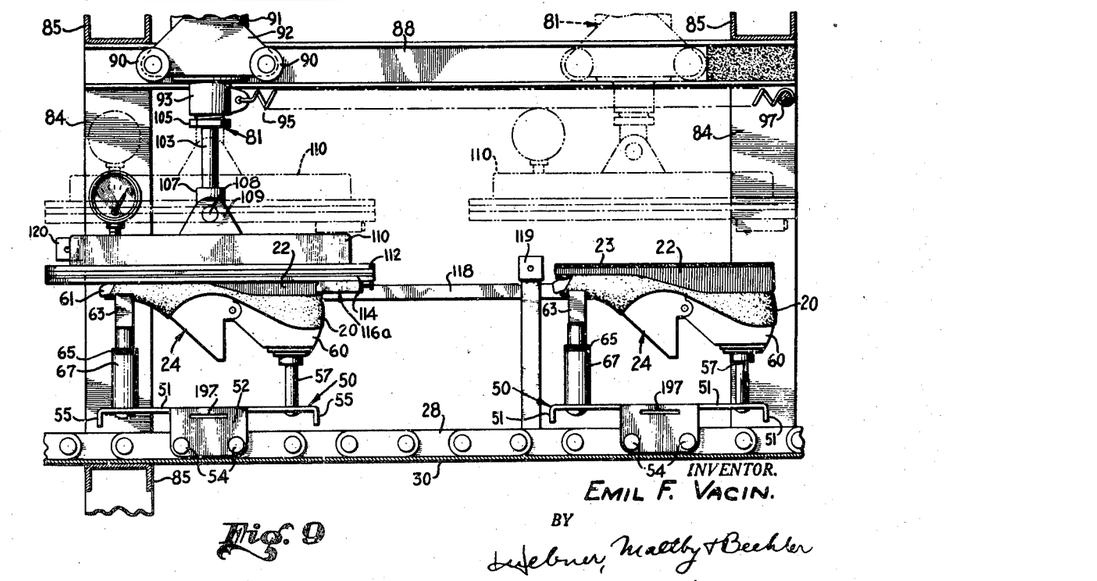
Figure 9 is an enlarged fragmentary sectional view similar to that of Figure 6 showing in solid lines the position of a press at the completion of a pressing operation and showing in dotted lines, respectively, release and return positions of the press.

Each last support has a flat base portion 51 of relatively stiff sheet metal. Down-turned side support portions 52 are formed, preferably integrally with the flat base portion 51. The side support portions 52, as shown in Figure 9, are drilled to receive link pins 54 of the conveyor chain on which the last support is mounted. A reinforcing flange 55 is turned down at each end of the base plate portion. The box-like structure of the base thus formed gives a high strength-to-weight ratio and does not in any way interfere with the free travel of the chains around the sprockets, since the pivot supports of the bases are co-axial with the pivot pins of the links of the conveyor chain over which they are mounted. A last heel support post 57 is secured to the base plate 51 as by riveting the lower end 58 of the post to the base plate. The upper end of the last heel support post 57 fits into a socket 59 in the heel portion 60 of the two part last 24 as shown in dotted lines in Figure 6. A toe portion 61 of the last is connected pivotally to the heel portion 60 as at 62. The toe portion 61 of the last is supported upon a spring pressed cradle support 63 as best illustrated in Figures 6 and 7.

The outer surface of the cradle support 63 is curved concavely in a plane transversely to the direction of travel of the conveyor chains. A spring pressed post 64 has its upper end affixed to the cradle 63, while its lower end passes through a ferrule 65 secured in the outer end of a tubular support member 67. The post 64 is free for slidable movement in the ferrule 65, and the lower end of the post 64 has an enlarged head portion 68 which limits the outward movement of the post in the ferrule. The lower end of the tubular member 67 is solid and is riveted in position on the base in the same manner as the heel support post 57. A coil spring 69 is held in compression between the enlarged head portion 68 of the post 64 and the solid lower end of the tubular member 67 to urge the cradle 63 upwardly. A shoulder 69a may be formed on the ferrule for the purpose of engaging the bottom of the cradle to limit the downward movement of the latter and thereby prevent overcompression of and injury to the coil spring 69.

To mount a last 24 on a base, the socket 59 of the last heel portion is placed over the heel support post 57 and the last is forced downwardly a sufficient distance so that the toe of the last engages the cradle 63 and depresses it somewhat against the pressure of the spring 69. When the last is released, the pressure of the spring 69 tends to force the toe of the last upwards and thereby places a torsional stress on the last about the heel post as a fulcrum. This causes the side walls of the socket to bind against the sides of the heel support post 57 and secures the last in place on its supports. By this construction the heel part of the last is solidly supported to permit downward pressure thereon while at the same time binding the last on the post 57 so that the last can be worked on or even pulled upwardly by an operator without danger of its becoming loose. In addition, a collar 59a is vertically adjustable on the post as by a set screw and/or thread to establish the height of the last upon the post.

To release the last from its support manually or mechanically, as hereafter explained, it is necessary only to force the toe portion downwardly or even pivotally sidewise a slight distance to align the axis of the socket 59 in the heel portion 60 of the last with that of the post 57 on which it is mounted. The post 57 has a free slidable fit in the socket 59, so that when the axis of the socket and its supporting post are thus aligned, the binding action created by the torque produced by the spring 69 is removed and the last may be readily slid off of the post 57.

Optionally the upper may be mulled before or after being placed on the last, and an expandable last for this purpose will be provided as hereinafter noted.

Figure 1:
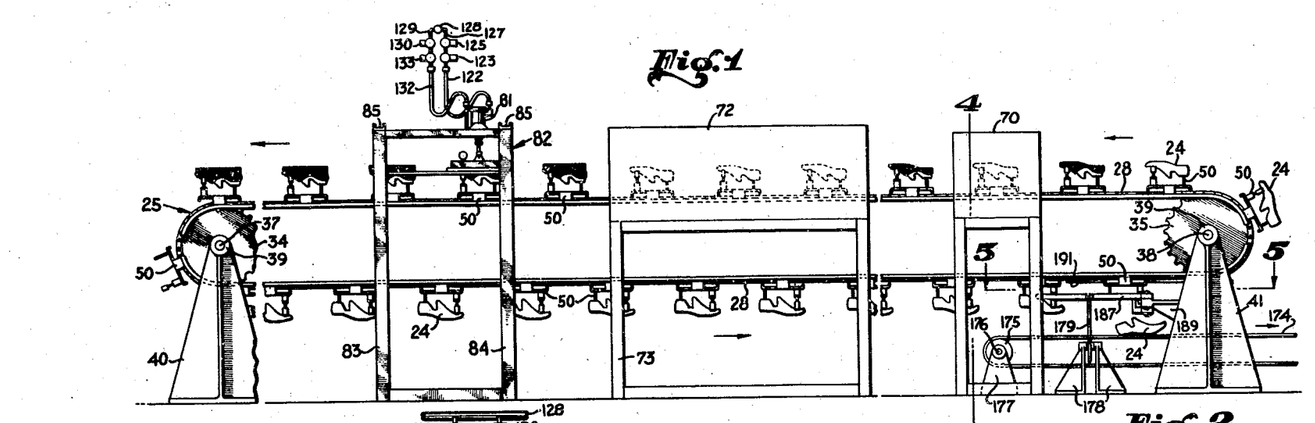
Figure 1 is a view in side elevation of one selected form of apparatus chosen to illustrate this invention, intermediate portions being broken away.
Figure 4:
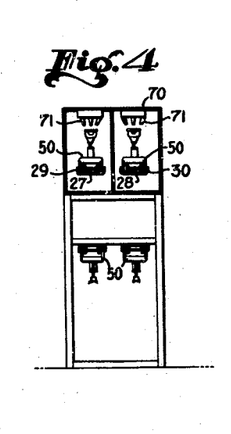
Figure 4 is a sectional view taken on the line 4—4 of Figure 1.

A spray hood 70 may be mounted over the conveyor as shown in Figures 1 and 4 and is preferably provided with spray heads 71 which are arranged to spray an adhesive solution onto the upturned lower surfaces of a pair of uppers 20, insoles 21 and/or midsole units as they pass along the conveyor beneath the spray heads. Often at the stage of manufacture where the spray hood is located on the conveyor, neither the midsole 22 nor the outsole 23 has been assembled on the shoe.

A drying oven 72 of conventional construction is supported on a frame 73 to enclose the two upper runs of the conveyor chains 27 and 28. It is contemplated that any other drier may be used as, for example, the lasts may be provided with metal parts or even made entirely of metal such as iron which may be heated by induction by coils or the like positioned on or adjacent the conveyor at the place indicated for the oven 72.

It is contemplated that where footwear is mulled, as by steaming, etc., before finally lasting it, the last may be manually or automatically expanded and the lasted parts subsequently dried as in an infra-red or other drying chamber. This drying may be accomplished in addition to or after the first or cement-drying operation and shrinks the footwear to conform it exactly to the last.

In the illustrated embodiment of the invention, the oven temperature may be in the range from 90° F. to 115° F. It is understood of course that temperature requirements may be affected by several different factors. Among these factors may be the use of different kinds of leathers and fabrics in the construction of the shoes, the use of different cements for spraying the shoes, and a variation in the length of time the shoes remain in the ovens.

The time the shoes remain in the ovens will depend, of course, on the speed of the conveyor, as adjusted by the speed controller, and on the length of the oven.

A pair of pneumatic presses 80 and 81, which comprise a feature of the present invention, are mounted one over each conveyor chain, to press the sole members tightly together and onto the lasted uppers of the shoes.

The presses are mounted on a frame 82 comprising frame support members 83 and 84 and cross frame members 85. A pair of longitudinally disposed inwardly facing channeled tracks 87 and 88 are provided for receiving rollers 89 and 90 mounted on each of the presses as shown in Figures 6, 7, and 9.

Each press has a cylinder 91 mounted vertically between a pair of side frames 92 which may be cast integrally with its cylinder. The rollers 89 and 90 are mounted on each of the side frame members 92, the rollers being mounted at the forward and rear ends, respectively, of the side frames, and optionally provided with rubber tires (not shown). The amount of pressure exerted may be varied as desired dependent upon the judgment of the operator as by adjustment of a pressure regulating valve (not shown) attached to a main pressure line hereinafter described and the amount of pressure so applied may be directly read from a pressure gauge 92' operated by a fluid, such as water, oil, air, or the like, tightly contained within a platen to be described.

A packing gland 93 extends downwardly from the lower end of the cylinder 91, for example, and an ear 94 extends rearwardly from the rear of the gland. A coil spring 95 has one end thereof hooked into an opening in the ear 94 while the other end of the spring is looped around a rod 97 which is mounted transversely beneath the tracks for this purpose. The spring 95 is held in tension between the ear 94 and the rod 97 normally to retain the press at the right hand end of its tracks as illustrated in Figure 6, and return it to that position after having been moved therefrom. A rubber bumper 98 is mounted in the channel of the track to provide a cushioned stop against which a roller impinges when the press is returned to its starting point under the action of the spring 95.

A press piston 99 is mounted in each cylinder 91 and is provided with sealing rings 100 to provide a substantially air-tight seal between the piston and the cylinder wall. A port 101 is provided in the upper end of the cylinder, and a second port 102 is provided in the lower end of the cylinder. These ports are connected to pneumatic actuating tubes and control valves as will be brought out later herein in describing the press actuating circuit.

A piston rod 103 which is secured at its upper end to the piston 99 projects through the gland 93 in the lower end of the cylinder 91. Gland packing 104 is provided around the piston rod and is compressed into sealing relation with the rod by a packing nut 105.

A bearing 107 is threaded onto the lower end of the piston rod 103 and receives a pivot pin 108. The pivot pin is pivoted in a pair of upright lugs 109 which project from the top of a press platen box.

The platen box 110 has downwardly extending sides 111 and a laterally projecting lower flange 112. A rubber or optionally leather diaphragm 113 is held in place over the open lower end of the platen box by a marginal frame 114 which may be substantially co-extensive with the flange 112. The frame 114 is secured to the flange 112 by screws 115, see Figure 8, to grip the marginal portion of the diaphragm. The screws also penetrate the marginal portion of the diaphragm to secure it more firmly in position. Instead of rubber, the diaphragm 113 may, as stated, be made of leather, fabric or other tough, flexible, impervious material. Within the platen chamber a heel stop 116 is provided, secured to the top of the box, and spaced from the normal position of the diaphragm to prevent the heel of a shoe from sinking too deeply into or rupturing the diaphragm. The space within the platen is preferably filled with fluid, as above set forth, to equalize the pressure applied to the shoe except that where the heel tends to penetrate too deeply into the diaphragm, it presses against the heel stop 116.

A heel positioner 116a (Figures 6 and 7A), may be affixed to the frame 114 of the platen as by screws 116b to engage and hold the sole and heel of a shoe against any rearward movement occasioned by the wedged shape of these parts.

Essentially the heel positioner comprises a concave heel-engaging surface 116c formed as on a transverse bar 116e having a chamfered upper edge 116d. As illustrated, the bar 116e may be slidable in the frame 114 but is normally urged in a direction against the heel of a shoe by a pair of coil springs 116f, of sufficient stiffness to overcome any rearward movement of the heel, held in position by guide pins 116g and axially slidable in the support bar 116h and/or the transverse bar 116e. Thereby the heel of a shoe is properly though yieldably centered and held forwardly with respect to the last and moreover, the chamfered edge 116d avoids injury to the back of the heel in the event that the descending platen fails, through accidental reasons, to line up properly with the heel and last.

A light beam projector 117 is mounted on a side frame member 118 for projecting a beam of light across the path of a lasted shoe sole as it is brought by the conveyor to a predetermined position beneath the press platen.

A selenium cell 119 or "electric eye" is mounted opposite the projector to receive its beam of light. The selenium cell is so constructed that when energized by its light beam, it will open selected circuits which it controls, and when de-energized by the cutting of its light beam it will close said circuits and open others. This arrangement is used in all the selenium cells employed in the present illustrative embodiment of the invention.

A second light beam projector 120 and selenium cell 121 are mounted to have the light beam interrupted by the press platen 110 as it reaches a point in its travel along the conveyor where it is desired to release the press.

Figure 13:
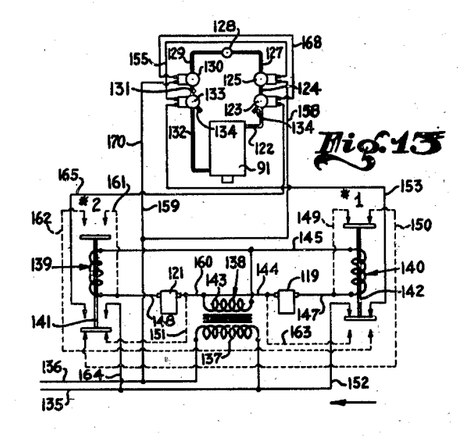
Figure 13 is a schematic circuit drawing showing a combined electric and pneumatic press control circuit.

A pneumatic arrangement for operating the presses is shown schematically in Figure 13 in conjunction with an electrical circuit for operation of the valves which control the pneumatic operation of the presses. The arrangement will be described for one press only.

Referring first to the pneumatic piping and valve arrangement, a tube 122 connects the press cylinder 91 with a top cylinder exhaust valve 123. A tube 124 is in open connection with the tube 122 at a point below the exhaust valve 123 and also with a top cylinder intake valve 125. The top cylinder intake valve 125 is in open connection through a tube 127 with a compressed air line 128 which in turn is connected to a source of compressed air, such as a compressor, not shown. The compressed air line 128 also is connected, as by a tube 129, to a bottom cylinder intake valve 130. A tube 131 connects the bottom cylinder intake valve 130 to a tube 132 at a point below a bottom cylinder exhaust valve 133. The bottom cylinder exhaust valve 133 is connected by the tube 132 into the port 102 in the lower end of the cylinder 91.

Each exhaust valve has a discharge outlet 134 open to the atmosphere through which compressed air from the cylinder is released when the exhaust valve is opened.

The valves are opened upon the energizing of an electric control mechanism.

Referring to the electrical portion of the circuit illustrated in Figure 13, a pair of power lines 135 and 136 are connected to a source of alternating current, such as a generator, not shown, and are connected one to each terminal of the primary coil 137 of a transformer 138.

A pair of solenoid actuated relays 139 and 140 normally have their armatures 141 and 142 in the downward position as illustrated for the left hand relay 139 in Figure 13, the armatures being raised to the operated position shown for the right hand relay 140 upon energization of their coils. The relays will be referred to in the following description also as #1 relay for relay 140 and #2 relay for relay 139, since this is the normal sequence of their operation.

A secondary coil 143 of the transformer 138 has one end thereof connected to a conductor 144 which is connected to one terminal of each of the selenium cells 119 and 121. The other end of the secondary coil 143 is connected to a conductor 145 which is connected at one end to a terminal of the coil of #1 relay and at the other end to a terminal of the coil of #2 relay.

From the other terminal of the #1 selenium cell 119 a conductor 147 is connected to the other end of the coil of #1 relay. Also from the other terminal of #2 cell 121 a conductor 148 is connected to the other terminal of the coil of #2 relay 139.

Thus when a circuit is completed through #1 cell 119 upon the cutting of its light beam as by the last or sole of the lasted shoe, a closing circuit for #1 relay 139 is established through the secondary coil 143, the conductor 145, the coil 140 of the #1 relay, and the conductor 147 back to #1 cell 119.

A holding circuit, for holding #1 relay closed as long as #2 relay remains in normal, unoperated condition, includes the conductors shown in dotted lines connected to the topmost pair of contacts of the #1 relay. These additional dotted conductors which provide this holding circuit are, first, the conductor 149 which is connected from the conductor 147 to one top contact of #1 relay, second a conductor 150 which is connected from another top contact of #1 relay to one of the bottom pair of contacts on #2 relay, and third, a conductor 151 which is connected from the other bottom contact of #2 relay to the conductor 144.

Upon the closing of relay #1 a power circuit to the valves for lowering the press piston also is completed, and remains completed as long as #1 relay is held in operated condition. In the power circuit, a conductor 152 is connected from one power lead 135 to one of the lower contacts on the #1 relay. From the other of the latter pair of contacts a conductor 153 is connected to a suitable valve actuator of the bottom cylinder exhaust valve 133. From the other side of the exhaust valve actuator a conductor 155 is connected to one side of the actuator of the top cylinder intake valve 125. From the other side of the top cylinder intake valve actuator a conductor 158 is connected to a conductor 159 which, in turn is connected to the other power lead 136. Thus upon the closing of the top-closing lower pair of contacts of the #1 relay, a circuit is completed through the circuit above described to energize the lower cylinder exhaust valve actuator and the top cylinder intake valve actuator, in series.

The valve actuators upon being thus energized open both the lower cylinder exhaust and top cylinder intake valves, thereby releasing the pressure below the piston to atmospheric, and increasing the pressure above the piston to force the piston down and press the leather diaphragm 113 firmly against the sole of the shoe which is beneath the press.

The press is held in the down position by the action of the holding circuit for the #1 relay, as above described, until the press is carried, by the action of the conveyor, to the left beyond the position illustrated in Figure 9 where the light beam to the #2 selenium cell 121 will be interrupted.

Upon interruption of the light beam to the #2 cell, a circuit is closed through this cell, through the conductor 148, the coil of #2 relay and the conductor 145, to one terminal of the secondary coil 143 of the transformer. From the other terminal of the secondary coil 143 a conductor 160 is connected to the other terminal of the #2 cell 121, thereby completing the circuit and raising the armature of the #2 relay to open its bottom-closing contacts and to close its top-closing contacts.

Upon operation of the #2 relay its bottom-closing contacts in the holding circuit for the #1 relay will be opened, thereby restoring the #1 relay to normal. The restoring of #1 relay to normal will open the power circuit through its lower pair of top-closing contacts and will thereby de-energize the actuators for the bottom cylinder exhaust valve 133 and the top cylinder intake valve 130, respectively. Since all four valves are of the normally self-closing type, these two valves will thereupon close.

A holding circuit for holding the #2 relay operated as long as the #1 relay is in normal condition includes the conductors shown in dotted lines connected to the topmost pair of contacts of the #2 relay. The conductors for this holding circuit include first, a conductor 161 connected from the conductor to one top contact of the #2 relay, second, a conductor 162 connected from the other top contact of the #2 relay to a bottom contact of the #1 relay, and third, a conductor 163 connected from the other bottom contact of the #1 relay to the conductor.

Upon the closing of the #2 relay, therefore, and the return to normal of the #1 relay, a holding circuit for the #2 relay is established from one terminal of the secondary coil 143 of the transformer through the conductors 145 and 161, through the top-closed contacts of the #2 relay through the conductor 162, through the bottom-closed contacts of #1 relay, and is completed through the conductors 163 and 144 to the other terminal of the secondary coil 143.

Upon the operation of the #2 relay a power circuit for returning the press to raised position also is completed through the lower pair of top-closing contacts of the #2 relay.

For this power circuit a conductor 164 is connected from the power lead 135 to one contact of the lower pair of top-closing contacts of the #2 relay. A conductor 165 is connected from the other contact of this pair to one side of an actuator of the top cylinder exhaust valve 123. From the other side of the valve actuator a conductor 168 is connected to one side of an actuator of the bottom cylinder intake valve 130. From the other side of the intake valve 130 a conductor 170 is connected to the conductor 159 which, in turn, is connected to the other power lead 136.

The closing of the lower set of top-closing contacts of the #2 relay therefore completes the power circuit, above described, through the top cylinder exhaust valve 123 and the bottom cylinder intake valve 130 in series, thereby opening both of these valves. The pressure above the piston is reduced to atmospheric by the opening of the top cylinder exhaust valve 123 and the increase of pressure below the piston by the inflow of compressed air through the bottom cylinder intake valve 130 raises the piston and with it the platen 110. This releases the diaphragm 113 from its engagement with the shoe sole and permits the coil spring 95 to return the press along the tracks 87 and 88 to its starting point.

A last removing mechanism for stripping selected lasts from their supports on the conveyor chain, and dropping the lasts onto a conveyor belt for transporting them to a desired destination, for example, to a last storage room, is shown in Figures 1, 5, 10, 11, and 12. In the construction illustrated, a pair of last conveyor belts 173 and 174 are mounted, one below the lower run of each of the conveyor chains 27 and 28. The last conveyor belts are supported on pulleys 175 which are mounted on a shaft 176 journalled in bearing standards 177. The other ends of the belts, not shown, are supported in a similar manner, and a suitable powered mechanism, also not shown, is arranged to drive the belts in a well-known manner. A pair of support standards 178 (see Figures 1, 5, and 10) are mounted one on each side of each last conveyor belt. An arm 179 is pivoted to the top of each of the standards, the upper end of each of the arms being offset inwardly to project over the conveyor belt adjacent which it is mounted. The lower end portions 180 of the arms extend downwardly below their points of pivotal connection to the standards on which they are mounted.

Figure 10:
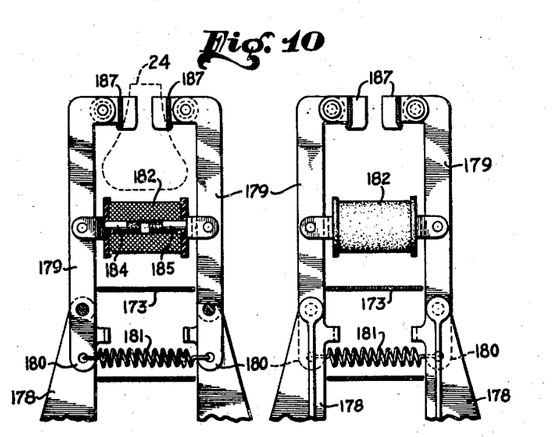
Figure 10 includes two enlarged fragmentary views, showing respectively, a vertical transverse mid-section, and an end elevational view, of a last stripping device, the position of a last on entering the stripper being indicated in dotted lines.
Figure 11:
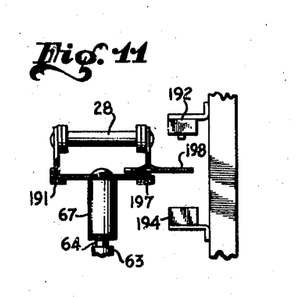
Figures 11 and 12 are views in transverse vertical section and horizontal transverse section, respectively, showing a fragment of a conveyor chain with a last support mounted thereon, and a clip, removably inserted in a slot in the side of a last support, for interrupting a light beam to a selenium cell or "electric eye."
Figure 12:
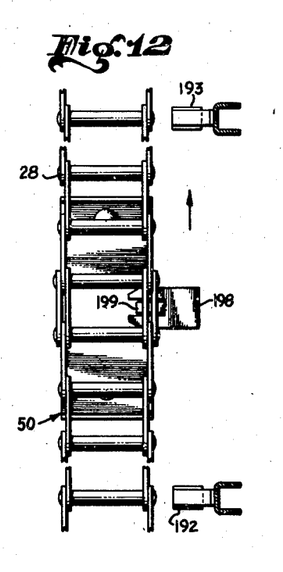

The arms associated with each conveyor belt are connected to each other below their points of pivotal support by a coil tension spring 181 normally to draw the lower ends of the arms 179 inwardly toward each other, and thereby separate the upper ends of the arms. A double armature solenoid 182 is connected across from one arm 179 of a pair to the other. The solenoid 182 consists of a customary coil and a pair of magnetically permeable armatures 184 and 185 which are mounted to telescope axially of the coil. The outer end of each armature is pivoted to the arm 179 which it operates, the solenoids being located a sufficient distance below the lower runs of the conveyor chains 27 and 28 to clear the lasts mounted thereon. An elongated steel cam band 187 is secured to the inner end of each of the inturned upper ends of the arms 179 as shown in Figure 10. The forward end of each of the bands 187 is mounted to pivot on a bracket 189 secured to the tail standard 41 of the chain conveyor.

The steel bands 187, which act as cams to strip selected lasts from their supports on the conveyor chain, are formed as shown in Figures 1 and 5. From their pivot support 189 they extend rearwardly toward the arms 179 a short distance and then are bent to project inwardly over the conveyor belt. They are bent again as at 190 to extend rearwardly, with respect to the travel of the lower run of the conveyor chains, and outwardly away from each other to a point beyond their connections to the arms 179. The cam strips 187 normally are held separated by the action of the coil springs 181 which separate the upper ends of the arms 179, permitting the lasts carried by the conveyor chains 27 and 28 to pass freely between them. When the coil of the solenoid 182 is energized, however, the cam strips are moved inwardly at their points of connection to the inturned ends of the arms 187, swinging inwardly about their pivot posts.

When the cam strips thus are drawn together they engage the tapered heel portion 60 of the last, as shown in Figure 10, stripping it downward as it is moved along the cam strips by the conveyor chain upon which it is mounted until the axis of the heel socket 59 is brought into alignment with the heel support post 57. This frees the last from the support post and permits it to drop onto the belt below it, as shown in Figure 1. A pair of angle iron tracks 191 (see Figures 1, 11, and 12) are mounted to support the conveyor chains during a last stripping operation.

Two vertically disposed light beam projectors 192 and 193 are mounted, one ahead of and one beyond the last stripper. The projectors are mounted above the lower run of the conveyor chains 27 and 28 and adjacent to one of them. A cooperating selenium cell is mounted below the lower run of the chain opposite each light beam projector to be energized by the light beam from it. These selenium cells, numbered 194 and 195, respectively, are designed to close the circuit which they control upon interruption of their light beams, and to open the circuit when their light beams strike them.

Each last support base 51 has a longitudinally disposed slotted opening 197 therein which is adapted to receive a clip 198 for intercepting light beams to the selenium cells 194, 195. Each clip 198 is formed with a spring arm 199 so that the clips may be inserted manually in the base of any last support from which it is desired to have the last stripped. The spring tension of the arm 199 of the clips is such as to retain the clips in the slots during their travel around the conveyor, but to permit easy manual insertion in and withdrawal of the arms from the slots.

Figure 14:
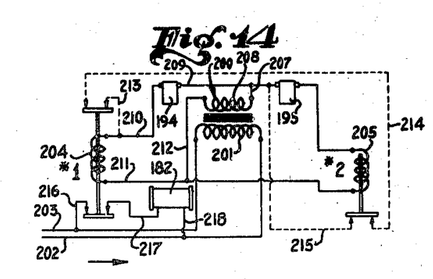
Figure 14 is a schematic circuit drawing showing a last stripping control circuit.

A schematic showing of the last-stripping electrical circuit, whereby the selenium cells are arranged to control the operation of the last stripper solenoids is illustrated in Figure 14.

A transformer 200 has its primary coil 201 connected to a pair of power leads 202 and 203, which are connected to a suitable source of alternating current, not shown. Two solenoid type relays 204 and 205 are arranged for operation by the selenium cells 194 and 195, above referred to. Both of the relays 204 and 205 normally have their armatures in the downward position. As illustrated in Figure 14, the left-hand relay 204 is shown in a raised operated condition, and the right-hand relay 205 is shown in a normal unoperated condition.

The double armature solenoid 182 of the last stripper is illustrated in its relative location in the circuit.

In the last stripping circuit the left-hand selenium cell 194 will be the first to be operated.

In the circuit for operating the cell 194 upon an interruption of its light beam, a conductor 207 is connected from one side of a secondary coil 208 of the transformer 200 to a conductor 209 which is connected from the cell 194 to the other cell 195. From the other side of the cell 194 a conductor 210 is connected to a terminal of the coil of the relay 204. From the other terminal of the coil of the relay 204 a conductor 211 is connected across to a terminal of the coil of the relay 205. The conductor 211 is connected to the other terminal of the secondary coil 208 of the transformer by a conductor 212.

Upon closing a circuit through the cell 194 therefore, by the interruption of the light beam from the projector 192 by the clip 198, a circuit is completed from the secondary coil 208 through the conductors 207 and 209, the cell 194, the conductor 210, the coil of relay 204, and conductors 211 and 212 to the other side of the secondary coil 208.

A holding circuit for holding the relay 204 operated as long as the relay 205 remains in a normal unoperated condition is provided by three conductors shown in dotted lines in Figure 14. These conductors comprise: first, a conductor 213 connected from the conductor 210 to one of the pair of top contacts of the relay 204; second, a conductor 214 connected from one of the top contacts of the relay 204 to one of the bottom contacts of the relay 205, and third, a conductor 215 connected from the other bottom contact of relay 205 to the conductor.

Upon the closing of the relay 204, the relay 205 being in normal unoperated condition, a holding circuit for relay 204 is established from one side of the transformer secondary coil 208, through the conductors 212 and 211, through the coil of the relay 204, through the conductor 213, the upper closed contacts of relay 204, the conductor 214, the lower closed contacts of relay 205, and is completed through the conductors 215, 209, and 207 to the other side of the transformer secondary coil 208.

A power circuit for operating the stripper solenoids is completed through the lower pair of top-closing contacts of the relay 204 when it is operated. From one power lead 203 a conductor 216 is connected to one of the pair of lower top-closing contacts of relay 204. From the other contact of this pair a conductor 217 is connected to a terminal of the solenoid 182. From the other terminal of the solenoid coil 182 the power circuit is completed by a conductor 218 connected to the other power lead.

In order to disclose clearly one of many other possible systems for handling the shoe parts, as above noted, so that the necessary parts and materials will arrive at each stage of their assembly as required, various steps in the manufacture of a pair of shoes similar to that illustrated in Figure 2 will be described.

Referring to Figure 1, the direction of travel of the top run of the conveyor chains 27 and 28 is from right to left as indicated by the arrows. The flow of parts for the uppers of each pair of shoes to be assembled is so scheduled that they will arrive at a position adjacent the initial station at the right-hand end of the conveyor at the same time that a pair of lasts, of a proper size and model, carried by the last supports 50 arrive at this initial assembly position on the conveyor. The lasts may be on the conveyor from a previous trip around or they may be mounted on a pair of bases 51 from which the previous lasts have been stripped.

It is desirable to have a complete set of lasts of the same model but of various sizes mounted on the conveyor when an extended run is to be made on a single model of shoe and the uppers and soles preferably are scheduled in the same order of sizes as the lasts on the conveyor. For this purpose a larger number of the more popular sizes of lasts are mounted on the conveyor with a smaller number of those sizes which are less in demand. When a required number of pairs of a certain size have been made, the lasts for that size can be stripped from the conveyor and replaced by a size for which additional requirement exists.

As a last support 50 is carried upward around the right-hand end of the conveyor, as illustrated in Figure 1, unless the proper lasts already are in position thereon, an operator, not shown, places a pair of lasts of a required size and model on the supports. An insole 21 first may be tacked or otherwise secured to the last and an upper 20 slipped or formed over the last. The lower marginal edge portions of the upper 20 are secured adhesively over the marginal edge portion of the insole. The last, with upper and insole lasted thereon, then enters the spray hood 70 and passes beneath the spray heads 71 where a coat of adhesive material, not shown, is sprayed over the insole and the exposed marginal edge portions, not illustrated, of the upper. It may be incidentally noted here that in the California type of construction, the midsole is applied to the bottom of the insole, and the midsole cover, which had previously been sewed around the edge of the upper and insole, is pulled up and cemented or otherwise secured to the bottom edges of the midsole before applying the outsole.

The upper then continues on into the drying oven 72 where the adhesive material is dried to a proper consistency.

The midsole 22 and outsole 23 may have heretofore been assembled together as a sub-assembly unit at another work area, not shown, before they arrive at the area between the drying oven 72 and the presses 80 and 81. Optionally also, before arriving at the conveyor the top and bottom surfaces of the midsole may be separately coated with adhesive, or adhesive may in any event be applied at least to the surface to be contacted by the outsole, and this midsole assembly may be separately or initially dried. If previously completed as a sub-assembly unit, the sole assembly may be scheduled to arrive at the area adjacent the conveyor between the drying oven 72 and the presses 80 and 81 as the lasted uppers for which the soles are scheduled emerge from the oven. The outsoles may also have been previously or simultaneously coated with cement and/or substantially dried.

The sole assemblies may next be positioned on their lasted uppers as shown at the right of Figure 1.

As the conveyor carries the lasted shoes with soles assembled thereon leftward from the position shown at the right side of Figure 1, the light ray to the #1 cell 119 of the press circuit, shown in Figure 13, is interrupted by the last or shoe sole 22—23 of the lasted shoe.

This operates the #1 relay 140 and thereby establishes the holding circuit for #1 relay as previously described. The power circuit to the bottom cylinder exhaust valve 133 and the top cylinder intake valve, respectively, is completed through the lower pair of top-closing contacts of #1 relay. This opens these two valves and forces the press pistons 99 downward, forcing the diaphragms 113 against the outsoles of the shoes in the manner shown by the sectional view through the platen in the right-hand position of Figure 6.

The presses are carried along their tracks 87 and 88 on the rollers 89 and 90 which are forced by the action of the presses against the upper flanges of the channeled tracks 87 and 88.

As the presses 80 and 81 pass to the left from the left-hand position shown in Figure 9, the platen box 110 interrupts the light beam to the #2 cell 121 of the press circuit of Figure 13. This closes the circuit which operates the #2 relay. The operation of the #2 relay opens the holding circuit for the #1 relay, which thereupon restores to normal position and closes the holding circuit for the #2 relay. The closing of the #2 relay completes the power circuit through its lower pair of top-closing contacts thereby energizing the bottom cylinder intake valve 130 and the top cylinder exhaust valve 123.

The actuation of these valves raises the pistons 99 and lifts their supported platens from the soles of the pair of shoes with which they have been in engagement. The raising of the platens frees the presses for rolling return movement along the tracks 87 and 88 under the tension of the spring 95.

The shoes are substantially completed when they leave the presses. They are then inspected, and if necessary spot cleaned. After inspection the shoes are removed from the lasts, and the lasts are carried around the left-hand end of the conveyor, as shown in Figure 1, and along the lower run of the conveyor.

If it is desired that a pair of lasts be removed by the stripper cams 187, one of the metal clips 198 is inserted in the slot 197 in one of the last support bases 51 as they pass the last inspection station. As the last supports in their travel along the lower run of the conveyor reach the first light beam projector 192 of the stripper, the clip 198 interrupts the light beam from the projector 192, see Figure 12. This interrupts the light beam to the selenium cell 194 and closes the circuit through the relay 204, see Figure 14, and actuates the double solenoid coil 182. The actuation of the relay 204 also completes its own holding circuit through the top contacts of the relay 204.

The energizing of the double armature solenoids 182 draws the cam strips 187 together to strip the selected lasts from their supports as the lasts are conveyed between the cam strips. As the lasts are released from their support posts 57 the lasts fall onto the conveyor belts 173 and 174 and are carried away to a desired area, not shown.

Figures 16, 17:
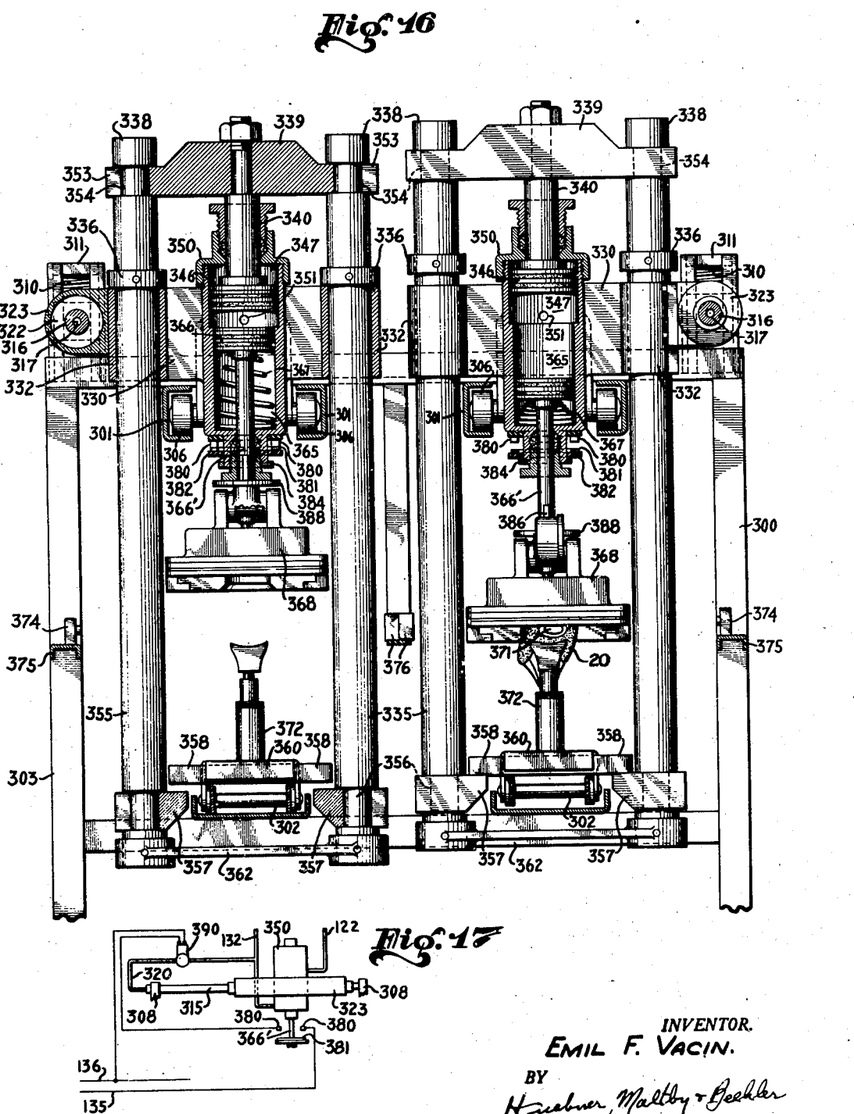
Figure 16 is an end elevational view taken as on the line 16—16 of Figure 15, parts being cut away to show the internal construction.
Figure 17 is a schematic view of a portion of a control mechanism for the press of Figures 15 and 16.

In Figures 15 through 17 another form of press mechanism is illustrated, in all respects similar to the form of Figures 1 through 14, but including a control system therefor operated by fluid under pressure and controlled by electrical means as hereinafter described.

In this last-named form of construction a frame generally designated by the numeral 300 comprises a pair of horizontal runways 301 paralleling a conveyor 302 and supported upon vertical frame members 303. A carriage generally designated by the numeral 305 is provided with rollers 306 by means of which the carriage and its associated structure may be moved along the runways.

Mounted on the general frame 300 are a pair of retaining blocks 307 within a housing 308. Square retainers 309 are positioned upon the retaining blocks within the housing 308 and are normally urged against said blocks by coil springs 310 held in a condition of tension by a key 311 or the like in order to provide a flexible support for and at either end of a horizontally disposed carriage cylinder rod 315. The carriage rod is provided with a fixed plunger 316 keyed or pressed thereon and contains a longitudinal bore 317 communicating with a conduit 320 connected to a source of fluid under pressure by means hereinafter to be described.

Lateral ports 321 communicate with a chamber 322 of a cylinder 323 which is axially slidable on the rod and surrounds the rod for approximately one-half of its length. This cylinder is axially slidable along the rod under the influence of hydraulic pressure admitted to the cylinder through the ports 321 so as to move the cylinder to the extreme of its right-hand travel, illustrated in Figure 15. On the other hand, the cylinder is carried to the extreme of its movement towards the right along the rod by means of a clamping association of parts connecting the cylinder with the conveyor in a manner hereinafter explained. An air vent 324 communicates with the interior of the cylinder on the left-hand side of the plunger 316 (Figure 15) for the obvious purpose of preventing a fluid lock of the cylinder in either direction of movement along the rod.

The carriage 305 is secured to the cylinder casing 323 by any suitable means as by a cross piece 330. Said cross piece is provided at its ends with cylindrical sleeves 332. The carriage plunger mechanism last above described, including the rod 315 and cylinder 323, is likewise secured to the cross piece 330 as, for example, at one of the sleeves 332.

Vertically slidable within the sleeves 331 and 332 are a pair of vertical lift rods 335 fitted with collars 336 keyed to the lift rods and designed to limit the downward sliding movement of these rods within the sleeves.

At their upper ends 338 the lift rods are further provided with a transverse yoke 339, by means of which an upper piston rod 340 may raise the lift rods under the influence of a plunger 346 reciprocal within a cylinder 350 positioned at the center of the cross piece 330. The plunger 346 is adapted to be raised and lowered under the influence of a fluid under pressure entering or leaving through its port 351 in a manner hereinafter to be more fully described. The yokes 339 are slotted at their ends 353 to make a sliding fit with restricted portions 354 of the upper end of the lift rods.

At their lower ends the lifting rods are provided with constrictions 356 to accommodate inwardly turned lugs 357 adapted to engage cooperative outwardly projecting lugs 358 secured to any number of last carriages 360 fixedly positioned on the conveyor 302. The conveyor is thereby raised at points adjacent the last carriages due to an upward movement of the upper piston 346 for the purpose of taking excessive strain off of the conveyor as later explained. A terminal tie rod 362 spaces and joins together the lower ends of the lift rods.

Referring now to the cylinder 350, a lower bore 365, axially aligned and openly communicating with a counterbore 347 in which the upper piston is slidable, is fitted with a plunger 366 to operate a lower plunger rod 366'. At its lower end the plunger rod 366' is pivotally secured to a platen 368 which is constructed in a manner similar to the platen 110, heretofore illustrated and described in connection with Figures 1 through 14, respectively. The plunger 366 is normally urged into a topmost position, such as that illustrated at the left-hand side of Figure 16, by means of a coil spring 367 which is intended to do little more than support the weight of the plunger and the platen 368. The spring is compressed and permits the downward movement of the piston under the influence of a fluid under pressure admitted through the port 351 causing the platen to engage a shoe 370 which may be disposed in a conventional manner upon a last 371 mounted upon supporting posts 372 and 373. The last and its supports are preferably of a construction similar to that of the embodiment first above illustrated and described. The lowermost position of the lower plunger 366 with the spring 367 in compression is illustrated at the right-hand side of Figure 16.

At the sides of the general frame 300 are a pair of fixed light beam projectors 374 mounted upon struts 375 at either side of the frame. Said light projectors are spaced longitudinally relative to the conveyor 302 from a second pair of similarly mounted light projectors 378. Both pairs of light projectors are established at such a level, with respect to the lasts 371 or platens 368, that the passage of a last or platen (in its lowered position) along the conveyor cuts the light beam which theretofore shone upon two pairs of selenium cells 376 and 379 opposite the light projectors 378 thereby operating an electrical circuit tending to appropriately open or close a conduit system, hereafter described, which actuates the pressure system controlling the upper piston 346 and lower plunger 366 substantially simultaneously but, the upper piston having a greater surface area and being required to carry more weight, with more power on the upper piston. The fluid inlet conduit 132, heretofore described, enters under the cylinder 350 under the lower plunger 366 to force the same upwardly, as will be explained.

Positioned under the cylinder 350, and surrounding the plunger rod 366', are a pair of fixed electrical contacts 380 which are adapted to be closed by an electrical contact ring 381 when the latter is urged upwardly by an insulating washer 382 on which the contact ring loosely rests. The insulating washer, which is slidable upwardly over a nipple 383 formed at the lower end of the cylinder 350, normally rests in turn upon a fixed retaining ring 384 which is preferably screwed or keyed to the nipple. Both said washer 382 and contact ring 381 are engaged and elevated by a pair of upwardly projecting fingers 386, secured to the lower end of the plunger rod as by means of a ring 388, when the lower plunger 366 is in its most upward position, as illustrated at the left-hand side of Figure 16.

The closing of the electrical circuit between the two contact points 380 opens a carriage control valve 390 (Figure 17) and permits the fluid within the pressure system to enter the conduit 320, the bore 315 and the lateral ports 321, so as to fill the cylinder chamber 322 and force the cylinder, the carriage and the associated press mechanism to the right as illustrated in Figure 15. This position corresponds to an initial phase of the press cycle and is designated generally by the letter "A" at the upper right-hand side of said figure.

A cycle of movement of the press of the modified form of this invention will now be described.

The cycle shall be taken as beginning at the initial "A" position (Figure 15) and then proceeding through successive stages, as illustrated at the positions illustrated at "B," "C," and "D" and back to "A."

The conveyor 302, which is moving continuously to the left as illustrated in Figure 15, carries with it the last 371 and the shoe 370 or upper disposed thereon in a conventional manner. At the point in conveyor movement where the last cuts the light beam of the projector 374 an electrical circuit opens the top cylinder intake valve which connects with the common pressure port 351 and also opens the bottom cylinder exhaust valve of the cylinder 350 under the lower plunger 366, thereby permitting any fluid under the lower plunger 366 to escape either into the atmosphere or the conduit 132 by way of a lower cylinder outlet port 392, as illustrated in dotted outline in Figure 15.

The entrance of fluid into the conduit 132 and thence into the cylinder 350 through the port 351 forces the upper piston 346 upwardly and the lower piston 366 simultaneously downwardly. The upper cylinder, upon raising, carries with it the lift rods 355 and their inturned lugs 357 which thereupon engage the undersides of the outwardly projecting lugs 358 in a manner to lift the last carriages and the conveyor 302, immediately adjacent, from its normal position of rest upon the general frame 300, so that when the downward movement of the lower plunger 366 causes the platen 368 to bear downwardly against the footwear and last, no pressure therefrom is directly borne by the conveyor 302. Thereby, any strain which might otherwise be placed upon the conveyor 302 and which would frictionally retard its normal movement to the left, as illustrated, is relieved so that breakages of the conveyor are prevented.

It may also be noted that on the downward movement of the lower piston the upwardly projecting fingers 386 are released from their abutment against the lower face of the insulating washer 382 permitting said washer and the contact ring 381 to drop away from the contact points and breaking the electrical circuit passing between these points. By this means the carriage control valve 390 is opened to the atmosphere on the side connected with the press mechanism and the pressure within the carriage cylinder 323 is reduced to atmospheric. The carriage 305 is then freed for movement to the left.

As soon as the platen, in its downward movement, engages the shoe and last, the last carriage 360 is lifted by the inwardly projecting lugs 357, the press then being at the "B" position illustrated in Figure 15. In the "B" position the platen pressure on the bottom of the shoe is registered upon a suitable pressure gauge 393. The pressure recorded is preferably that of the fluid within the platen and may be regulated by a pressure regulating valve, not shown, positioned in the main pressure conduit 128, heretofore illustrated and described.

The lifting action of the lugs 357 and the downward pressure of the platen results in a clamping action between the platen and these lugs so as to cause a frictional engagement between the press and the conveyor whereby the press mechanism is carried along with the conveyor 302 towards the left, while the pressure upon the shoe remains at a maximum dependent upon the fluid pressure within the system. Meanwhile any fluid entrapped within the cylinder 323 escapes through the ports 321, the bore 317, the conduit 320, and the carriage control valve 390.

By the time the press mechanism has been carried to the left to the "C" position and the last and/or platen are in a position to cut the beam of the light beam projector 378 so as to open the top cylinder exhaust valve 125 and also the bottom intake valve 130. The opening of the bottom intake valve forces the lower plunger 366 upwardly thereby relieving pressure upon the last and immediately thereafter making contact between the electrical contact points 380 so as to open the carriage control valve 390 and force the cylinder 323 to the right to its initial "A" position.

While the press is in the "D" position the lift rods 335 return to their lowermost position so as to disengage the inwardly projecting lugs 357 from their supporting engagement under the upwardly projecting lugs 358 of the last carriage 360. Coincident with this unclamping of the parts, the conveyor no longer draws the press mechanism further to the left so that there is a freedom of movement of the carriage towards the "A" position as established by the length of the cylinder 323 and the position of the stationary piston 316, or by any suitable stop 395. Each time a last passes by the first light projector 374, a similar cycle is started and inasmuch as no last is illustrated on the conveyor at the far side of Figure 15 (left side of Figure 16), no cycle occurs in that half of the conveyor corresponding to the cycle caused by the passage of the last 371 illustrated.

It will therefore be seen that applicant has provided a press in combination with a continuous belt, chain, or other conventional conveyor upon which are positioned a plurality of removable lasts so that a continuous footwear manufacturing process may be conducted without the necessity of bringing the several constituent parts of a proposed piece of footwear individually to the conveying mechanism or assembly line. The press in both of its forms is adapted to provide a uniform pressure upon the outsole, midsole (if any), and upper and to the coverings therefor, so as to create a uniform article of footwear of improved strength and wearing qualities with a minimum of manual operations.

While the conveyor and its associated structures, including the press, are intended to be provided in duplicate corresponding to left and right shoes, only one side of the device has been described, although both sides have been represented. The mechanism, except for the driving portions, such as a motor, are intended to be bilaterally symmetrical and conjointly operated in all substantial respects. It is contemplated, however, that wherever possible or desirable, duplication of parts will be eliminated and it is within the contemplation of this invention to provide a unitary system of controls, including such mechanism as a single carriage return control and plunger-cylinder mechanism for both the right and left sides of the conveyor. It is also contemplated that a single set of light beam projectors and selenium cells may operate to control both the left and right press assemblies simultaneously.

The gist of this invention is the provision of a continuously operated footwear conveyance mechanism having associated therewith a plurality of shoe manufacturing devices so that a uniform and economical product of prime workmanship may be developed.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

Having described my invention, what I claim as new and desire to secure by Letters Patent is:

1. An apparatus for the manufacture of footwear comprising conveyor means adapted for the removable mounting thereon of a plurality of lasts, adhesive-applying means associated with the conveyor means adapted to apply an adhesive to selected parts of articles of footwear positioned upon the lasts, mulling means and drying means associated with the conveyor means adapted to cure said adhesive to a predetermined extent and conform said footwear to the last, press means movably associated with the conveyor means adapted to force together selected shoe bottom parts to which adhesive has been applied, and last stripping means associated with the conveyor means adapted to strip selected lasts therefrom.

2. An apparatus for the manufacture of footwear comprising conveyor means adapted for the removable mounting thereon of a plurality of lasts; adhesive-applying means associated with the conveyor means adapted to apply an adhesive to selected parts of articles of footwear positioned upon the lasts, said adhesive applying means comprising a hooded member positioned above and athwart the conveyor, spaced from one end thereof; and downwardly focused ejection nozzles stationed within the hooded member to spread an adhesive substantially uniformly downwardly upon preselected upturned surfaces of said footwear parts, drier means associated with the conveying means adapted to cure said adhesive to a predetermined extent, press means movably associated with the conveyor means adapted to force together selected shoe parts to which adhesive has been applied, and last stripping means associated with the conveyor means adapted to strip selected lasts therefrom.

3. An apparatus for the manufacture of footwear comprising movable conveyor means adapted for the removable mounting of a plurality of lasts, adhesive-applying means associated with the conveyor means adapted to apply an adhesive to selected parts of articles of footwear positioned upon the lasts, drier means associated with the conveying means adapted to cure said adhesive to a predetermined extent, said drier means comprising an oven having sides and a top alongside and above the conveyor for a portion of the length of said conveyor, press means movably associated with the conveyor means adapted to squeeze together selected shoe parts to which adhesive has been applied, and last stripping means associated with the conveyor means adapted to strip selected lasts therefrom.

4. An apparatus for the manufacture of footwear comprising conveyor means adapted for the removable mounting of a plurality of lasts, adhesive-applying means associated with the conveyor means adapted to apply an adhesive to selected parts of articles of footwear positioned upon the lasts, drier means associated with the conveyor means adapted to cure said adhesive to a predetermined extent, a sole press frame mounted adjacent the conveyor, a sole press mounted for vertical and horizontal movement on the frame and vertically movable into frictional and pressing engagement with a shoe sole, said frictional engagement being effective to move the press longitudinally of and with the conveyor, press release means mounted for operation upon a predetermined longitudinal movement of the press, press return means operative upon vertical release of the press from said sole to return the press to an initial position of longitudinal movement, and last-stripping means associated with the conveyor means adapted to strip selected lasts therefrom.

5. An apparatus for the manufacture of footwear comprising endless conveyor means adapted for the removable mounting of a plurality of lasts, adhesive-applying means associated with the conveyor means adapted to apply an adhesive to selected parts of articles of footwear positioned upon the lasts, drier means associated with the conveyor means adapted to cure said adhesive to a predetermined extent, a channeled track mounted substantially parallel to and adjacent an operative portion of the conveyor, a sole press, a plurality of rollers mounted on the press and having guided rolling connection with the track, a press actuating element carried by the conveyor, press actuating means operatively associated with the press, press actuating control means mounted at a predetermined point in the path of the press actuating element to operate the press actuating means at a moment when a last carried by the conveyor is opposite the press, thereby moving the press into operative engagement with said last, the press while so actuated being free for rolling movement along the track in the direction of and with the conveyor means, press release control means mounted in the path of movement of said element carried by the conveyor at a predetermined distance beyond the press actuating control means to release the press from an actuated condition, automatic means for returning the press along the track on release of the press from said actuated condition, and last stripping means associated with the conveyor means adapted to strip selected lasts therefrom.

6. An apparatus for the manufacture of footwear comprising conveyor means adapted for the removable mounting of a plurality of lasts, adhesive-applying means associated with the conveyor means adapted to apply an adhesive to selected parts of articles of footwear positioned upon the lasts, drier means associated with the conveyor means adapted to cure said adhesive to a predetermined extent, a frame, a sole press mounted on the frame for movement longitudinally of the conveyor, means actuating the press toward the sole of a last carried by the conveyor at a moment when said last is opposite the press, means for releasing the press a predetermined distance beyond the actuating means, resilient means mounted to return the press to an initial position on release from said engagement, and last stripping means associated with the conveyor means adapted to strip selected lasts therefrom.

7. An apparatus for the manufacture of footwear comprising movable conveyor means adapted for the removable mounting of a plurality of lasts, adhesive applying means associated with the conveyor means adapted to apply an adhesive to selected parts of articles of footwear positioned upon the lasts, drier means associated with the conveyor means adapted to cure said adhesive to a predetermined extent, a sole press, a plurality of rollers mounted on the sole press, a track mounted to support the rollers for guided rolling movement thereon, an electrically controlled fluid-operated mechanism mounted to urge the press toward an end of the track opposite to the direction of movement of the conveyor, electrically controlled, fluid-operated press actuating means mounted in the path of movement of the conveyor to actuate the press when a last is opposite the press, and electrically controlled, fluid-operated press release means mounted a predetermined distance of conveyor travel beyond the press actuating means to release the press for return movement by said electrically controlled, fluid-operated control mechanism, and last stripping means associated with the conveyor means adapted to strip selected lasts therefrom.

8. An apparatus for the manufacture of footwear comprising movable conveyor means adapted for the removable mounting of a plurality of lasts, adhesive applying means associated with the conveyor means adapted to apply an adhesive to selected parts of articles of footwear positioned upon the lasts, drier means associated with the conveyor means adapted to cure said adhesive to a predetermined extent, a plurality of rollers carried by the sole press, a channeled track mounted to support the rollers therein, means mounted to urge the press toward an end of the track opposite to the direction of movement of the conveyor, press actuating control means mounted in the path of conveyed movement of a last on the conveyor, and operatively associated with the press to actuate the press on an operation of the press actuating control means, and press release control means mounted in the path of movement of a last on the conveyor a predetermined distance beyond the press actuating control means to release the press for return movement from an actuated position, and last stripping means adapted to strip selected lasts therefrom.

9. An apparatus for the manufacture of footwear comprising movable conveyor means adapted for the removable mounting of a plurality of lasts, adhesive applying means associated with the conveyor means adapted to apply an adhesive to selected parts of articles of footwear positioned upon the lasts, drier means associated with the conveyor means adapted to cure said adhesive to a predetermined extent, a sole press, a track mounted to support the press for movement longitudinally of the conveyor, a press actuating element carried by the conveyor, a press actuating control circuit operatively associated with the press, a selenium cell mounted adjacent the conveyor and in controlling relation to the press actuating circuit, a light beam projector mounted to project a light beam into the selenium cell to activate the cell and open the circuit which it controls, the press actuating element being positioned to intercept the light beam and open the circuit as a last moves opposite the press, and a second similarly lighted selenium cell operatively connected to the press operating circuit to release the press from operated condition on interception of its light beam, the second lighted cell being positioned to have its light beam intercepted by a conveyor-moved element a predetermined distance of conveyor travel beyond the operating point of the first cell, and last stripping means associated with the conveyor means adapted to strip selected lasts therefrom.

10. An apparatus for the manufacture of footwear comprising movable conveyor means adapted for the removable mounting of a plurality of lasts, adhesive applying means associated with the conveyor means adapted to apply an adhesive to selected parts of articles of footwear positioned upon the lasts, drier means associated with the conveyor means adapted to cure said adhesive to a predetermined extent, a sole press having a cylinder, a plurality of rollers mounted on the press, a piston operatively mounted in the cylinder, a platen operatively connected to the cylinder adjacent the path of movement of a last carried by the conveyor, a track mounted to support the rollers for rolling movement thereon, a second piston and cylinder mounted to urge the press toward an end of the track opposite to the direction of movement of the conveyor, a press actuating element carried by the conveyor and connected to a source of fluid under pressure, fluid pressure control means operatively associated with the cylinder and with the source of fluid under pressure, the fluid pressure control means having an operating element thereof mounted in the path of movement of the press actuating element carried by the conveyor to direct fluid under pressure into the press cylinder at a moment when a last is adjacent the platen so as to drive the piston and its supported platen against the last, press release means mounted a predetermined distance of conveyor travel beyond the press operating means to retract the press, and an actuating control associated with the press to operate said second piston and cylinder and drive the press to an initial position in an operational cycle from which its piston may again be driven towards a last, and last stripping means associated with the conveyor means adapted to strip selected lasts therefrom.

11. An apparatus for the manufacture of footwear comprising movable conveyor means adapted for the removable mounting of a plurality of lasts, adhesive applying means associated with the conveyor means adapted to apply an adhesive to selected parts of articles of footwear positioned upon the lasts, drier means associated with the conveying means adapted to cure said adhesive to a predetermined extent, press means movably associated with the conveyor means adapted to force together selected shoe parts to which adhesive has been applied, and last stripping means associated with the conveyor means adapted to strip selected lasts therefrom, said stripping means comprising a pair of spaced cam members adapted to encompass preselected lasts therebetween, said cam members being vertically pivoted and spring urged outwardly, gripping means urging the cam members together at a predetermined point in the travel of the lasts to grip individual selected lasts and strip them from the conveyor means, releasing means for releasing said cams from their gripping engagement with the selected lasts and disposal means for removing said lasts to a place of storage after they have been stripped from the conveyor means.

12. An apparatus for the manufacture of footwear comprising movable conveyor means adapted for the removable mounting of a plurality of lasts, adhesive applying means associated with the conveyor means adapted to apply an adhesive to selected parts of articles of footwear positioned upon the lasts, drier means associated with the conveyor means adapted to cure said adhesive to a predetermined extent, press means movably associated with the conveyor means adapted to force together selected shoe parts to which adhesive has been applied, and last stripping means associated with the conveyor means adapted to strip selected lasts therefrom, said stripping means comprising a pair of spaced cam members adapted to encompass pre-selected lasts therebetween, said cam members being spring urged outwardly, gripping means urging the cam members together at a predetermined point in the travel of the lasts to grip said selected lasts and strip them from the conveyor means, releasing means for releasing said cams from their gripping engagement with the selected lasts, and disposal means for disposing with said selected lasts after the selected lasts have been stripped from the conveyor means, said gripping means comprising an electro-magnet disposed between the cam members, a photo-electric actuating means for said electro-magnet, said conveyor means being formed with slots corresponding to each of said lasts, a tripping clip adapted to be removably inserted in selected slots to actuate said photo-electric actuating means at a predetermined point in the travel of said conveyor means, and a photo-electric releasing means positioned at a predetermined space beyond said actuating means adapted to actuate the photo-electric releasing means and permit the separation of the cam members from their gripping engagement with the selected lasts.

13. In an apparatus for manufacturing footwear comprising a conveyor support, a continuously movable power-driven conveyor mounted upon said support, and a footwear press associated with said conveyor for pressing selected parts of the bottoms of said footwear between said press and any one of a plurality of lasts carried by said conveyor, the improvement which comprises: a press-supporting framework, a footwear press mounted upon said supporting framework, said framework including a runway substantially paralleling said conveyor, a carriage associated with the framework and adapted to travel along said runway both in and opposed to the direction of normal movement of said conveyor, at least one piston supported in said framework, a vertically oscillable lift member associated with said piston, abutments associated with the conveyor and the lift member, respectively, adapted to releasably support the conveyor at points adjacent the lasts in a manner to raise the conveyor at said points upon a pre-selected movement of said piston, a footwear pressure platen associated with the piston adapted to press preselected footwear bottom parts against the lasts under the influence of the piston and frictionally carry said carriage and press along said runway by the normal powered movement of the conveyor, and means adapted to drive and retract the piston at predetermined intervals.

14. In an apparatus for manufacturing footwear comprising a conveyor support, a continuously movable power-driven conveyor mounted upon said support, and a footwear press associated with said conveyor for pressing selected parts of the bottoms of said footwear between said press and any one of a plurality of lasts carried by said conveyor, the improvement which comprises: a press-supporting framework, a footwear press mounted upon said supporting framework, said framework including a runway substantially paralleling said conveyor, a carriage associated with the framework and adapted to travel along said runway both in and opposed to the direction of normal movement of said conveyor, at least one piston supported in said framework, a vertically oscillable lift member associated with said piston, abutments associated with the conveyor and the lift member, respectively, adapted to releasably support the conveyor at points adjacent the lasts in a manner to raise the conveyor at said points upon a pre-selected movement of said piston, a footwear pressure platen associated with the piston adapted to press preselected footwear bottom parts against the lasts under the influence of the piston and frictionally carry said carriage and press along said runway by the normal powered movement of the conveyor, means adapted to drive and retract the piston at predetermined intervals and actuating means adapted to control the action of the piston, releasing means adapted to relieve the pressure of the piston and retract said piston after a predetermined interval of conveyor travel, and reversing means adapted to return said carriage and press to an initial starting position with relation to the conveyor support upon the retraction of said piston.

15. In an apparatus for manufacturing footwear comprising a conveyor support, an endless power-driven conveyor mounted upon said support, and a footwear press associated with said conveyor for pressing selected parts of the bottoms of footwear between said press and any one of a plurality of lasts carried by said conveyor, the improvement which comprises: a press-supporting framework, a press mounted upon said supporting framework, said framework including a runway substantially paralleling said conveyor, a carriage associated with the framework and adapted to travel along said runway both in and opposed to the direction of normal movement of said conveyor, an upwardly powered reciprocable piston reciprocally supported in said framework, a vertically oscillable lift member associated with the upwardly powered piston, laterally extending portions associated with the conveyor and the lift member, respectively, adapted to support the conveyor at points adjacent the lasts in a manner to raise the conveyor at said points upon an upward movement of said upwardly powered piston, a pressure platen associated with the lower end of the downwardly powered piston adapted to squeeze selected shoe bottom parts against the lasts under the influence of a downward movement of the downwardly powered piston and thereby simultaneously frictionally carrying said carriage and press along said runway by the normal powered movement of the conveyor, fluid means adapted to drive the upwardly powered piston in an upward direction and also to drive the downwardly powered piston in a downward direction, electrical actuating means adapted to control the action of the pistons substantially simultaneously, electrical releasing means adapted to relieve the pressure of the pistons and retract said pistons after a predetermined interval of conveyor travel, and an electrically-controlled fluid reversing means adapted to return said carriage and press to an initial starting position with relation to the conveyor support upon the retraction of one of said pistons, said framework having a vertical cylindrical bore therein and a counterbore in the upper end of said bore and having a pressure port connected with a source of fluid under pressure, said downwardly powered piston being reciprocable in the bore and said upwardly powered piston being reciprocable in the counterbore, said pressure port being positioned between said pistons and adapted to force said pistons apart simultaneously.

16. In an apparatus for manufacturing footwear comprising a conveyor support, a power-driven conveyor mounted upon said support, and a shoe press associated with said conveyor for squeezing selected parts of the bottoms of said shoes between said press and any one of a plurality of lasts carried by said conveyor, the improvement which comprises: a press-supporting framework, a press mounted upon said supporting framework, said framework including a runway substantially paralleling said conveyor, a carriage associated with the framework and adapted to travel along said runway both in and opposed to the direction of normal movement of said conveyor, upwardly and downwardly powered pistons respectively supported in said framework, a vertically oscillable lift member associated with the upwardly powered piston, laterally extending portions associated with the conveyor and the lift member respectively, adapted to support the conveyor at points adjacent the lasts in a manner to raise the conveyor at said points upon an upward movement of said upwardly powered piston, and a pressure platen associated with the lower end of the downwardly powered piston adapted to press selected bottom parts of footwear against the lasts under the influence of a downward movement of the downwardly powered piston and thereby simultaneously frictionally carrying said carriage and press along said runway by the normal powered movement of the conveyor, means adapted to drive the upwardly powered piston in an upward direction and also to drive the downwardly powered piston in a downward direction, press actuating means adapted to control the action of the pistons substantially simultaneously, press releasing means adapted to relieve the pressure of the pistons and retract said pistons after a predetermined interval of conveyor travel, and reversing means adapted to return said carriage and press to an initial starting position with relation to the conveyor support upon the retraction of one of said pistons, said framework having a vertical cylindrical bore therein and a counterbore in the upper end of said bore, and having a pressure port connected with a source of fluid under a predetermined pressure, said downwardly powered piston being reciprocable in the bore and said upwardly powered piston being reciprocable in the counterbore, said pressure port being positioned between said pistons and adapted to force said pistons apart simultaneously though with greater total force on the upwardly powered piston, said bore being formed with a lower shoulder, a coil spring mounted in the bore adapted to seat against the shoulder and normally pressing the downwardly powered piston in an upward direction with force at least sufficient to sustain the weight of said last-named piston and of the shoe pressure platen.

17. In an apparatus for manufacturing footwear comprising a conveyor support, a power-driven conveyor mounted upon said support, and a press associated with said conveyor for squeezing selected parts of the bottoms of footwear between said press and any one of a plurality of lasts carried by said conveyor, the improvement which comprises: a press-supporting framework, a fluid-operated, electrically controlled shoe press mounted upon said supporting framework, said framework including a runway substantially paralleling said conveyor, a carriage associated with the framework and adapted to travel along said runway both in and opposed to the direction of normal movement of said conveyor, upwardly and downwardly powered pistons respectively supported in said framework, a vertically oscillable lift member associated with the upwardly powered piston, laterally extending portions associated with the conveyor and the lift member, respectively, adapted to support the conveyor at points adjacent the lasts in a manner to raise the conveyor at said points upon an upward movement of said upwardly powered piston, and a pressure platen associated with the lower end of the downwardly powered piston adapted to press selected bottom parts of footwear against the lasts under the influence of a downward movement of the downwardly powered piston and thereby simultaneously frictionally carrying said carriage and press along said runway by the normal powered movement of the conveyor, fluid means adapted to drive the upwardly powered piston in an upward direction and also to drive the downwardly powered piston in a downward direction, electrical actuating means adapted to control the action of the pistons substantially simultaneously, electrical releasing means adapted to relieve the pressure of the pistons and retract said pistons after a predetermined interval of conveyor travel, and an electrically controlled fluid-reversing means adapted to return said carriage and press along said runway to an initial starting position following the retraction of one of said pistons, said reversing means comprising a horizontally mounted fluid-driven piston connected to the conveyor support and the carriage and adapted to be moved in a direction substantially parallel to the direction of motion of the conveyor, and said reversing means incorporating an electrical contact upon the carriage and the down-powered piston, respectively, whereby fluid is admitted under pressure to one side of the horizontally mounted piston to return the same together with the carriage and press to said initial starting position along said runway.

EMIL F. VACIN.

REFERENCES CITED

The following references are of record in the file of this patent:

UNITED STATES PATENTS

| Number | Name | Date |
|---|---|---|
| 1,536,879 | Carter | May 5, 1925 |
| 1,594,688 | Perry | Aug. 3, 1926 |
| 1,850,151 | Kinney | Mar. 22, 1932 |
| 2,005,621 | Habicht | June 18, 1935 |
| 2,078,588 | Smith | Apr. 27, 1937 |